United States Patent [19]

Jackley et al.

[11] 4,134,704
[45] Jan. 16, 1979

[54] TAPERED HOLE CUTTER

[75] Inventors: Robert D. Jackley, El Monte; Richard T. Perez, San Pedro, both of Calif.

[73] Assignee: Deutsch Fastener Corp., Los Angeles, Calif.

[21] Appl. No.: 780,819

[22] Filed: Mar. 24, 1977

[51] Int. Cl.² .................... B23B 51/00; B23B 51/06
[52] U.S. Cl. ........................................ 408/57; 408/59; 408/211
[58] Field of Search ................ 408/57, 59, 119, 211, 408/223, 224, 226, 227, 228

[56] References Cited

U.S. PATENT DOCUMENTS

| 571,253 | 11/1896 | Wesselmann et al. | 408/223 |
|---|---|---|---|
| 2,587,980 | 3/1952 | Doepker | 408/211 X |
| 2,655,964 | 10/1953 | Labbee | 408/224 |
| 2,732,869 | 1/1956 | Stearns | 408/224 |
| 3,116,654 | 1/1964 | Nider | 408/228 |
| 3,238,836 | 3/1966 | Johnson | 408/224 X |
| 3,591,302 | 7/1971 | Andreasson | 408/59 |
| 3,758,222 | 9/1973 | Oakes | 408/224 |

Primary Examiner—Al Lawrence Smith
Assistant Examiner—James G. Smith
Attorney, Agent, or Firm—Gausewitz, Carr & Rothenberg

[57] ABSTRACT

A blade type rotary cutter for cutting tapered holes in metal workpieces. The cutter blade is elongated and generally flat, being tapered in the "width" direction for applying the taper to the hole, and being tapered in the "thickness" direction so that the cutting edge along the length of the blade will lead the cutting edges proximate the point and thereby minimize point drift. All cutting edges of the blade are provided with a substantial negative rake for chip control, and the chips are blown out of the hole by jet streams of cutting fluid directed along the longitudinal cutting edges of the blade.

25 Claims, 8 Drawing Figures

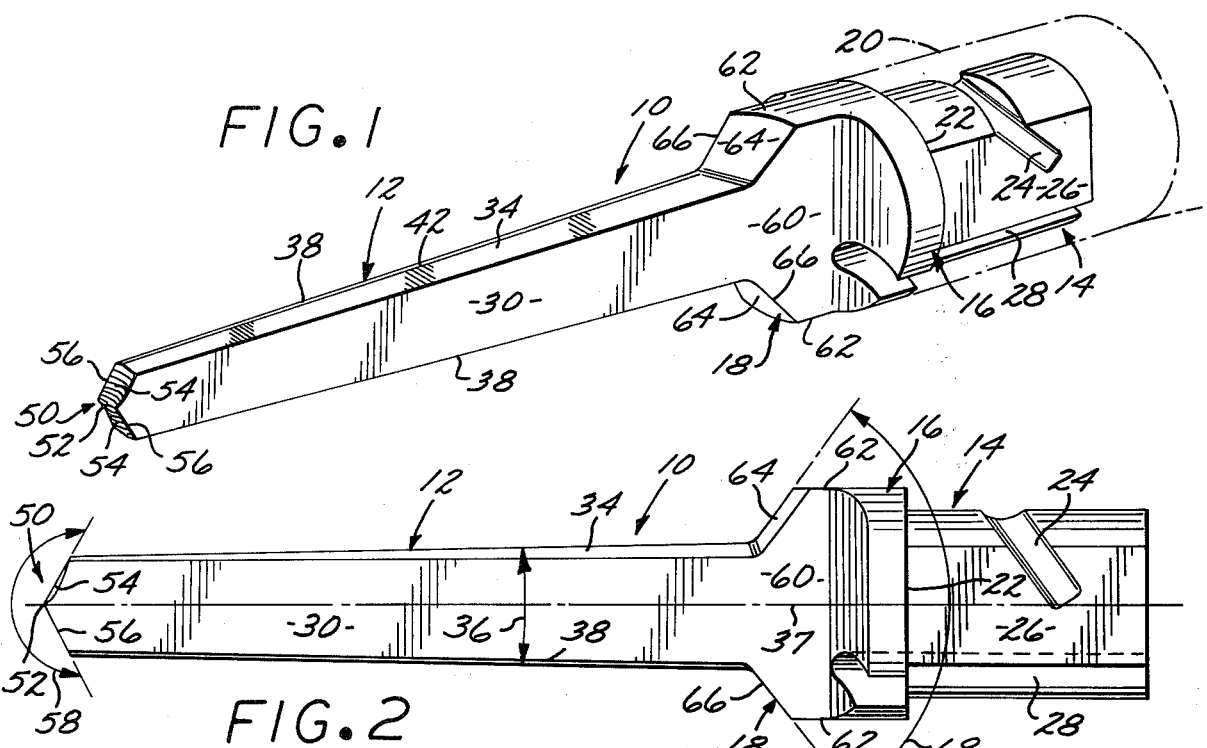
FIG. 1
FIG. 2
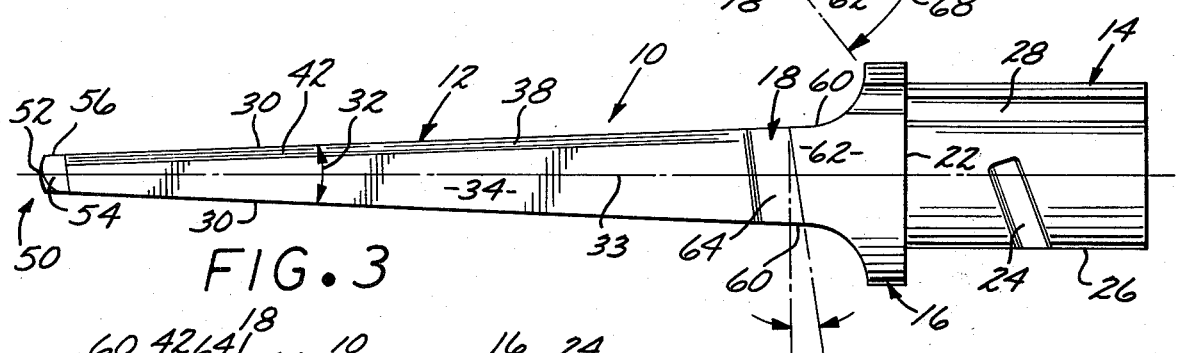
FIG. 3
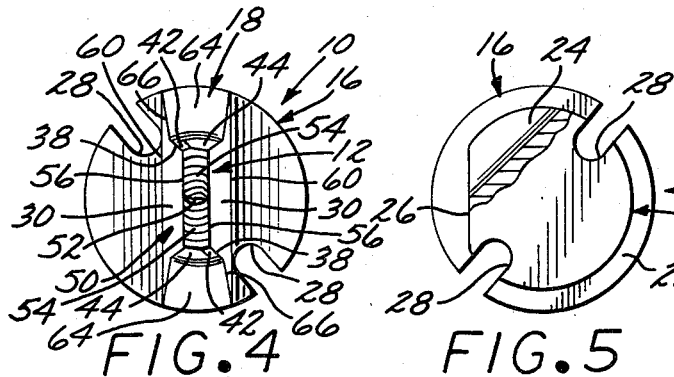
FIG. 4  FIG. 5
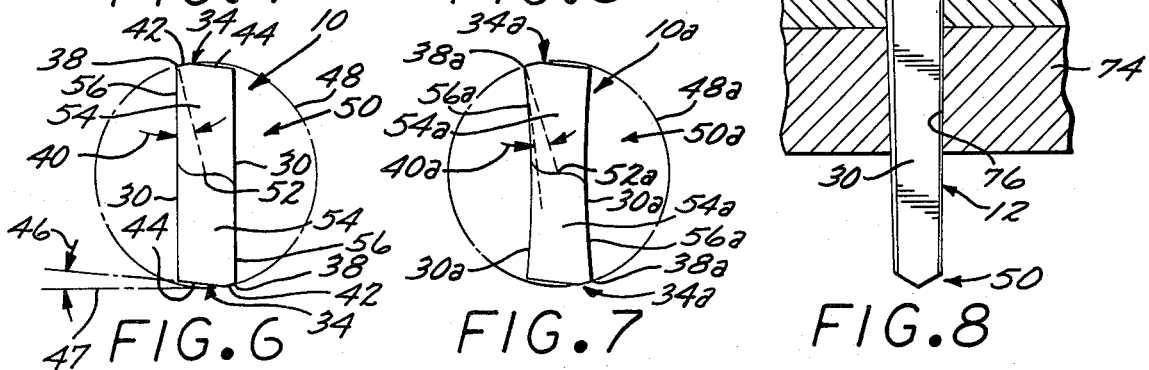
FIG. 6  FIG. 7  FIG. 8

TAPERED HOLE CUTTER

BACKGROUND OF THE INVENTION

1. Field of the Invention

The invention is in the field of cutters for cutting tapered holes in metal workpieces.

2. Description of the Prior Art

Tapered interference preload fastening of highly stressed structures in accordance with the teachings of Zenzic U.S. Pat. No. 3,034,611 is currently and has for a number of years been widely utilized in aircraft and space vehicles, and in some of the high performance aircraft it is the only type of fastening capable of providing the required strength-to-weight ratio and fatigue characteristics for a number of the structural joints. However, prior to the present invention such tapered interference preload fastening has been considerably more expensive than conventional straight hole fastening, primarily because of the problems involved in reliably preparing tapered holes with the required dimensional accuracy and finish.

The conventional practice for preparing tapered holes in metal structures to receive tapered interference fasteners is to first drill a tapered hole with a tapered twist drill, and then to employ a second, reaming operation utilizing a tapered twist-type reamer to produce the final tapered hole dimensions and finish. This duplication of effort required in adding the reaming step after the drilling step has generally been found necessary where twist-type drills and reamers were employed to achieve the reliability of hole quality necessary to assure reliability of the interference preloading in the structures which are being fastened. In addition to this problem of duplication of effort, the twist-type drills and reamers are characteristically complex and expensive to make, and have a relatively limited operational life. An example of a typical twist-type reamer conventionally employed in the preparation of tapered holes for receiving tapered interference type fasteners is found in Briles U.S. Pat. No. 3,460,410.

Accordingly, with the conventional practice of using twist drills and twist-type reamers to produce tapered holes of the required dimensional reliability and bore finish for receiving tapered interference fasteners, both the tools and the drilling and reaming operations were much more difficult and expensive than for the preparation of straight, cylindrical holes.

Applicants are not aware of any prior art drill or cutter other than those of the twist type mentioned above that is capable of producing a tapered hole in a metal workpiece suitable for receiving a tapered interference preload fastener in a system such as that disclosed in Zenzic U.S. Pat. No. 3,034,611. (More particularly, applicants are not aware of any prior art blade-type cutter capable of producing a tapered hole in a metal workpiece suitable for such a tapered interference fastening system.)

One of the most difficult problems to cope with in the use of both prior art blade-type cutters and twist-type drills and reamers is a tendency for the point to drift or wander as it travels through the workpiece, due primarily to non-homogeniety of the workpiece material. This problem is compounded in the case of twist drills and reamers because of their tendency to unwind. This is one of the reasons why successive drilling and reaming operations have heretofore generally been required to produce tapered holes of sufficient reliability for use in a high performance tapered interference fastening system.

Another serious problem in the use of prior art cutters, drills and reamers for producing high quality tapered holes is that such prior art devices conventionally produce chip strings which tend to be difficult to eject from the hole, and which have a tendency to gall and thereby spoil the surface finish of the hole.

Johnson U.S. Pat. No. 3,238,836 discloses a tapered cutter blade, but such blade is a self-tapping lead-in part of a sheet metal screw which produces a complex reaming extrusion at the margin of the aperture in the sheet metal for gripping by the threads of the screw. The lead-in blade part of the Johnson screw is not suitable for cutting a tapered hole in a metal workpiece; it has a non-uniform taper, and has a single asymmetrical cutting edge with a positive rake angle. Skelton U.S. Pat. Nos. 1,405,020 and 1,405,021 disclose blade-type tapered reamers which have no points and consequently cannot cut holes, and which employ positive rake angles at their cutting edges; the Skelton reamers also not being suitable for cutting tapered holes in metal workpieces. Blade-type cutters for producing straight holes are disclosed in Southall U.S. Pat. No. 3,920,350, Backus U.S. Pat. No. 82,583 and Warner U.S. Pat. No. 67,825. Prior art non-twist straight hole cutters of this general type are normally only usable for cutting holes in wood, with the fine wood particles being allowed to build up in the hole. Attempts to cut metal with such tools would normally produce uncontrollable metal chip strings.

SUMMARY OF THE INVENTION

In view of these and other problems in the art, it is an object of the present invention to provide a blade-type rotary cutter which is suitable for cutting tapered holes in metal workpieces.

Another object of the present invention is to provide a blade-type cutter for cutting tapered holes in metal workpieces which is capable of producing tapered holes with a high degree of reliability as to both dimensional accuracy and surface finish.

A further object of the present invention is to provide a tapered hole cutter which requires only a single advancing and withdrawal cycle for producing tapered holes in metal workpieces with a high degree of reliability as to both dimensional and surface finish control.

A further object of the present invention is to provide a blade-type tapered cutter which is capable of producing tapered holes in metal workpieces which are sufficiently reliable as to both configuration and bore finish for use in a high performance fastening system such as the interference preload tapered aerospace fastener system disclosed in Zenzic U.S. Pat. No. 3,034,611.

A still further object of the present invention is to provide a novel tapered hole cutter of the character described wherein the usual point drift or wander associated with most prior art hole cutters or drills is substantially completely eliminated, whereby the problem of hole "triangulation" is minimized or eliminated.

Yet a further object of the present invention is to provide a cutter for cutting tapered holes in metal workpieces which has particularly good chip control, reliably producing chips during the cutting operation that are of a size suitable for being blown out of the hole, and which completely avoids the production of chip strings such as would tend to load up the hole and gall the hole surface.

Another object of the invention is to provide a blade type tapered hole cutter of the character described which has cutter fluid passage means in a rearward mounting portion thereof adapted to direct a jet stream of cutting fluid along each cutting edge of the blade for blowing the chips out of the hole.

Another object of the present invention is to provide a tapered hole cutter which is particularly economical both to manufacture and to use, enabling the cost of preparing tapered holes in metal workpieces to be reduced to where it is comparable to the cost of preparing straight holes.

An additional object of the invention is to provide a blade-type cutter for cutting tapered holes in metal workpieces which has a longer operational life than conventional twist type tapered hole drills and reamers.

The blade-type tapered hole cutter of the present invention comprises an elongated, generally flat blade which is uniformly tapered in the "width" direction for applying the desired taper to a hole being cut by the cutter; and which is also uniformly tapered in the "thickness" direction so that the cutting edge of the blade proximate the point will trail the cutting edge along the shank and the point will therefore not control the direction of the cutter, and the point will consequently not tend to drift or wander as it travels through the workpiece. The maximum range for the thickness taper angle is from about 3° to about 8°, with a preferred range of from 4° to about 6½°.

The cutting edges along the length of the blade have a substantial negative rake angle, preferably within the range of from about 10° to about 16°, which causes the blade to reliably break up the chips that are formed during cutting to a small enough size so that they can be continuously blown out of the hole, and to prevent formation of strings of chips.

The edge surfaces of the blade each include a relatively narrow leading bearing surface portion next to the cutting edge and a relatively wide trailing relief surface portion, the bearing surface portion preferably being within the range of from about 0.003 inch to about 0.010 inch in width, and the relief surface portion preferably breaking from the bearing surface portion at a relief angle of from about 3° to about 8°; the bearing surface width range assuring axial stability of the cutter and avoiding "cladding" of the cutter with workpiece material, and the edge margin relief angle range also assuring cutter stability and avoiding rubbing and galling by the trailing parts of the edges.

The cutting edges of the point of the blade also have a negative rake to assure good chip breakup, and the blade thickness/width ratio proximate the point is preferably within the range of from about ⅛ to about 1/5 to assure accurate point tracking during initial penetration of the blade through the surface of the workpiece.

The cutter is provided with a rearward mounting portion for connection with a rotary driving tool, this mounting portion having cutting fluid passage means therein for receiving cutting fluid from the driving tool and directing a pair of jet streams of cutting fluid along the cutting edges of the blade for blowing the chips out of the hole.

BRIEF DESCRIPTION OF THE DRAWINGS

These and other objects of the invention will become more apparent in reference to the following description and the accompanying drawing, wherein:

FIG. 1 is a perspective view of one form of blade-type cutter according to the invention;

FIG. 2 is a side elevational view of the blade-type cutter shown in FIG. 1;

FIG. 3 is an edge elevational view of the cutter shown in FIGS. 1 and 2;

FIG. 4 is a front end elevational view of the cutter shown in FIGS. 1-3;

FIG. 5 is a rear end elevational view, with a portion broken away, of the cutter shown in FIGS. 1-4;

FIG. 6 is a diagrammatic front end elevational view of the cutter shown in FIGS. 1-5 particularly illustrating the negative rake angle of each of the blade cutting edges, the bearing and relief surface portions of the edge surfaces of the blade, and the relief angle at each of the blade edges;

FIG. 7 is a diagrammatic end elevational view similar to FIG. 6, but illustrating another form of the invention wherein the side surfaces of the cutter blade are concave in transverse section; and FIG. 8 is an elevational view, partly in section, illustrating a blade-type cutter according to the invention engaged through a laminar workpiece at the completion of the cutting of a tapered hole.

DETAILED DESCRIPTION

FIGS. 1-6 and 8 of the drawing illustrate a presently preferred form of blade type cutter according to the invention for cutting tapered holes in metal workpieces. This blade type cutter is generally designated 10, and includes a forward blade portion 12, a rearward shank or mounting portion 14, and an enlarged intermediate portion including an annular collar 16 and an countersink-forming portion 18.

The rearward shank or mounting portion 14 of cutter 10 is adapted to be axially engaged within a suitable holder sleeve 20 shown in phantom lines, the holder sleeve 20 adapting the cutter 10 to the rotary driving spindle of a suitable conventional power driving tool (not shown). The rearwardly facing shoulder 22 of collar 16 engages against the forward annular edge of holder sleeve 20 to locate the cutter 10 in holder sleeve 20, and a generally transverse slot 24 is provided in the shank or mounting portion 14 of cutter 10 for bayonet-type locking engagement thereof in the holder sleeve 20. A driving flat 26 is provided on the shank or mounting portion 14 of cutter 10 and is drivingly engageable with a corresponding flat section (not shown) within the holder sleeve 20.

The blade 12, countersink-forming portion 18, collar 16 and rearward shank or mounting portion 14 are all axially aligned with each other and with the holder sleeve 20, so that the blade 12 and countersink-forming portion 18 of the cutter 10 will be rotated about their longitudinal axial centers by the driving tool.

A pair of cutting fluid channels 28 is arranged in the cutter 10 to supply a continuous jet stream of cutting fluid along each of the cutting edges of the blade 12 during operation of the cutter 10. These cutting fluid channels 28 are preferably provided as illustrated in the form of a pair of diametrically opposite, radially outwardly opening, straight grooves that are oriented parallel to the longitudinal axis of the cutter 10 and substantially in alignment with the respective leading, cutting edges of blade 12. The holder sleeve 20 surrounds the rearward shank portion of cutter 10 in close-fitting relationship and thereby provides outer wall means for these longitudinal cutting fluid channels 28. Although the cutting fluid channels 28 are shown as open grooves in the region of annular collar 16, it is to be understood that they may alternatively include hole portions extending through the collar 16.

Cutting fluid is supplied under pressure from a suitable source (not shown) through the power driving tool and associated holder sleeve 20, the fluid being confined and directed as it passes forwardly through the channels 28 into a pair of jet streams that are aimed along the non-cutting edges of the blade. Any conventional cutting fluid may be employed with the cutter 10. Preferably air or a cutting mist is used, but if desired a liquid cutting fluid may be employed. The manner in which the two jet streams of cutting fluid cooperate with the cutter blade 12 during rotation thereof for the efficient ejection of all cutting chips from the tapered workpiece bore will be described in detail hereinafter.

Referring particularly to FIGS. 1-4 and 6 of the drawing, in the form of the invention there illustrated the forward blade portion 12 of the cutter may be broadly described as being elongated and generally flat, with a pair relatively wide, oppositely facing flat side surfaces 30 and a pair of relatively narrow, oppositely facing edge surfaces 34. The direction from one side 30 to the other side 30 of blade portion 12 will sometimes hereinafter be referred to as the "thickness" direction, while the direction from one edge 34 to the other edge 34 of blade portion 12 will sometimes hereinafter be referred to as the "width" direction. The blade 12 is tapered in both the thickness direction and the width direction. Thus, in the thickness direction the blade 12 has a uniform taper between the side surfaces 30 of an included angle designated 32 in FIG. 3, the blade 12 being thinner proximate the forward, point end than it is proximate the rearward end adjacent the countersink-forming portion 18. Similarly, the blade 12 has a uniform taper in the width direction between edge surfaces 34 of an included angle designated 36 in FIG. 2, the width of blade 12 being less proximate the forward point end of blade 12 than it is proximate the rearward end adjacent the countersink-forming portion 18.

The thickness taper is preferably symmetrical on opposite sides of an axial plane 33 extending in the width direction as shown in FIG. 3; i.e., the included thickness taper angle 32 is preferably equally distributed on opposite sides of the central axis of the cutter 10. Similarly, the width taper is preferably symmetrical on opposite sides of an axial plane 37 extending in the thickness direction as shown in FIG. 2; i.e., the included width taper angle 36 is preferably equally distributed on opposite sides of the central axis of the cutter 10.

The amount of the width taper angle 36 will be determined by the purpose for which the tapered hole that is being cut by the cutter 10 is to be used. For example, if the tapered hole is to be used as a part of a high performance tapered fastening system for aircraft and space vehicles like that disclosed in Zenzic U.S. Pat. No. 3,034,611, then the width taper will preferably be approximately ¼ inch per foot, or a width taper angle 36 of approximately 1° 11 feets 38 inches.

The thickness taper of the blade 12 as represented by taper angle 32 in FIG. 3 is an important aspect of the present invention, substantially eliminating cutter point drift or wander, which is otherwise a very serious problem in both blade type cutters and twist type drills and reamers. Any workpiece is to some extent non-homogeneous, which tends to make the point of a drill or reamer drift or wander as it travels through the workpiece. Without the thickness taper of the present invention, it has been found that with blade type cutters for cutting tapered holes this problem of point drift or wander is serious, and that many of the holes become to some extent "triangulated" due to point drift or wander. In the use of conventional twist drills and reamers, the point leads the cutting edge and thereby controls the direction of drilling all of the way through the hole, and a combination of the effect of the point striking non-homogeneous material in a workpiece and the drill tending to unwind in a non-uniform manner results in a serious drift or wander problem.

However, with the thickness taper of the present invention, once the point of the blade has gone past the surface through which the cutter is entering, then the thickness taper will cause the cutting edge proximate the point of the blade 12 always to trail the cutting edge of the blade above the point, so that all of the way through the hole the upper part of the cutting edge will lead the part of the cutting edge proximate the point and the point will never control the direction of drilling and reaming regardless of the point encountering non-homogeneous workpiece material. The result is the substantially complete elimination of the usual point drift or wander, with tapered holes of improved reliability and quality being produced.

The preferred range for the included thickness taper angle 32 is from about 4° to about 6½°, while the maximum range for the included thickness taper angle 32 is from about 3° to about 8°. The optimum thickness taper angle 32 for the cutting of any particular tapered hole depends upon the material of which the workpiece is composed. For example, tests indicate that in a blade type cutter 10 employed for cutting a tapered hole in aircraft aluminum or titanium, the best included thickness taper angle 32 is approximately 4½°. For a cutter 10 employed to cut a tapered hole in Inconel, or steel such as 9 Nickel 4 cobalt steel or PH13-8 age hardenable stainless steel, the best included thickness taper angle 32 is approximately 6°.

An included thickness taper angle 32 of at least about 3° is required to minimize or substantially eliminate point drift or wander and resulting hole "triangulation" so that accurate point tracking will occur throughout the length of each hole, and the cutting of substantially "true" tapered holes will be reliable. As the thickness taper angle 32 is increased above the minimum angle of about 3°, there is, of course, even less tendency for the point to drift, and the greater thickness taper angle gives the forward blade portion 12 of the cutter 10 greater structural strength, which is desirable for cutting through relatively tough material such as Inconel or steel. However, as the thickness taper angle 32 is increased, the increased lead of the upper part of the cutter edge over the part proximate the point results in the cutter not cutting as freely, and greater torque and axial thrust are therefore required. Also, as the thickness taper angle 32 is increased, the resulting increased thickness of the upper or rearward part of the blade 12 begins to block the chip exit so that the chips do not flow out as freely; and at the same time the lateral spacing between the cutting and trailing edges at each of the side surfaces 30 of the blade 12 decreases so that there is a less discrete definition between the cutting fluid entrance passage and the chip exit flow space, with a resulting tendency of the cutting fluid inflow to intereferre with the free exiting of the chips. Above about an b 8° thickness taper angle 32 the accumulation of these adverse factors tends to cause galling and questionable hole quality.

The cutter 10 is adapted to be driven in a clockwise direction (looking forward from the rearward shank or mounting portion 14) for cutting a tapered hole. Thus, as viewed in FIG. 5 the cutter 10 will be rotated clockwise, while as viewed in FIGS. 4 and 6 the cutter 10 will be rotated anticlockwise. Thus, each of the side surfaces 30 has a leading edge and a trailing edge, and these leading edges of the side surfaces 30 where the side surfaces 30 intersect the respective edge surfaces 34 form a pair of elongated blade cutting edges 38 which are best seen in FIGS. 4 and 6, but are also seen in FIGS. 1 and 2. In the present invention these cutting edges 38 are each provided with a substantial negative rake angle, and this is another important aspect of the invention. This negative rake angle is the angle 40 illustrated in FIG. 6, and is the angle included between a radius line which is shown as a dotted line from the axial center of the blade to one of the cutting edges 38 and the direction of the side surface 30 where it terminates at the cutting edge 38. The preferred range for the cutting edge negative rake angle 40 proximate the point end of the blade 12 is from about 10° to about 16°. The purpose of this relatively large negative rake angle is to cause the blade 12 to reliably break up the chips that are formed to a small enough size so that they can be continuously blown out of the hole by the cutting fluid throughout each hole cutting operation.

The conventional twist drill or reamer has a positive rake angle, and tends to cut the chips in the form of strings which are jacked out of the hole by the helical flutes of the twist drill or reamer. However, a blade type of cutter cannot jack the chips out, and the chips must therefore be blown out, which causes the chip control problem to become a critical one. As the blade 12 of the present cutter is cutting a hole through a workpiece, the two jet streams of cutting fluid which are directed from channels 28 along the leading, cutting edges 38 of blade 12 pick up the chips and blow them back out of the hole proximate the trailing edges of the blade. It will be apparent from the drawing that there is only a very limited amount of space available between the side surfaces 30 of blade and the wall of the hole for both entry of the cutting fluid jet streams and ejection thereby of the chips. It has been found that if the negative rake angle is too small, or if there is a zero or positive rake angle, then the chips tend to form in strings, which prevents the chips from being cleanly blown out of the hole. Chip control is then lost, the chips tending to clog up the fluid and causing galling and degeneration of the finish in the hole. On the other hand, if the negative rake angle is too great, then the cutting shear planes appear to get confused and tearing of the workpiece material tends to occur rather than cutting which again results in galling in the hole and degeneration of the finish in the hole.

The configuration of each of the edge surfaces 34 is also an important factor in achieving reliable hole surface quality. Each of the edge surfaces 34 includes a leading bearing surface portion 42 immediately adjacent to the respective blade cutting edge 38, and a trailing relief surface portion 44 which occupies the remainder of the respective edge surface 34. Each of the bearing surface portions 42 is arcuate relative to the central longitudinal axis of the blade 12 as best seen in FIG. 6, while each of the relief surface portions 44 is preferably flat. As shown in FIG. 6, each of the relief surface portions 44 trails its respective bearing surface portion 42 at a relief angle 46 relative to a line 47 perpendicular to the side surfaces 30 and to the axial plane 33. For convenience in visualizing this relief angle 46, a circle 48 has been shown in phantom, which is coaxial with the longitudinal axis of the blade 12 and is coincident with the arcs of the bearing surface portions 42.

The width of each of the bearing surface portions 42, between the respective cutting edge 38 and relief surface portion 44, is preferably within the range of from about 0.003 inch to about 0.010 inch. It has been found that if the bearing surface portions are too wide, then the edge surfaces 34 tend to "clad up" with material from the workpiece. This is a critical problem when cutters according to the present invention are employed for cutting tapered holes in aluminum workpieces. On the other hand, if the bearing surface portions 42 are too narrow, then the cutter will tend to lose its axial stability and there will be a tendency to produce out-of-round holes.

The preferred range for the edge margin relief angle 46 is from about 3° to about 8°, with a preferred relief angle 46 of about 5° 30'. If the relief angle 46 is too small, then more axial push is required on the tool, and the blade does not cut freely, with a result that rubbing and galling occur proximate the trailing edges of the edge surfaces 34 and hole quality becomes questionable. On the other hand, if the relief angle 46 is too great, then the blade 12 tends to "chatter" in the hole, and stability tends to be lost so that the holes are not as consistent.

The point of the cutter blade 12 is generally designated 50. For most workpiece materials it is preferred to employ a point 50 of the type commonly referred to as a helical drill point, and this is the type of point 50 that is illustrated in the drawing. Thus, for aircraft aluminum or titanium workpieces, the point 50 will normally be of the helical type, For some workpiece materials, such as steels, a "split crankshaft" type of point such as the standard NAS 907-P3 point may alternatively be used.

Point 50 includes center or crown 52 and forwardly facing, generally helically formed point surfaces 54 which intersect at their leading edges with side surfaces 30 to form point cutting edges 56. The point angle 58, which is the angle between the point cutting edges 56 forwardly of the point as shown in FIG. 2, is preferably on the order of about 135°.

The point cutting edges 56, like the blade cutting edges 38, are provided with a negative rake angle to assure good chip breakup at the point cutting edges 56 as the point is advancing first through the initial surface of the workpiece and then through the body of the workpiece. This negative rake angle for the point cutting edges 56 is provided by extending the flat side surfaces 30 straight down to their intersections with the point surfaces 54. Accordingly, as will be apparent from FIG. 3 of the drawing, the negative rake angle for the point cutting edges 56 will be equal to one-half of the included thickness taper angle 32, and will be in a preferred range of from about 2° to about 3¼°, and a maximum range of from about 1¼° to about 4°. The negative rake angle for each of the point cutting edges 56 is that angle included between the axial plane 33 and the respective side surface 30.

A further factor of importance regarding the point 50 of blade 12 is the ratio of blade thickness to blade width proximate the point 50. Having the blade thickness/width ratio proximate the point within the range of from about ⅛ to about 1/5, and preferably about ¼, is important to assure accurate tracking of the point, and avoidance of point drift or wander, from first penetration of the point into the surface of the workpiece until the point 50 has completed penetration through the surface of the workpiece and the edge bearing surface portions 42 commence to enter the hole.

The countersink-forming portion 18 includes flat side surfaces 60 which are simply rearward continuations of the respective blade side surfaces 30, arcuate edge surfaces 62 which are forward continuations of the annular collar 16, and inclined forwardly facing surfaces 64 which are helically formed similarly to the forward point surfaces 54. The leading edges of the inclined forwardly facing surfaces 64 intersect the respective side surfaces 60 at countersink cutting edges 66. The countersink cutting angle 68 between countersink cutting edges 66 as shown in FIG. 2 will typically be about 100°. It is to be noted that the countersink cutting edges 66 also have a negative rake angle which is the same negative rake angle as that of the point cutting edges 56.

FIG. 7 diagrammatically illustrates another embodiment of the present invention wherein the cutter 10a has a concave-sided blade 12a wherein the side surfaces are concave in transverse cross section, while nevertheless being straight in longitudinal section.

The elongated blade cutting edges 38a of concave-sided blade 12a have a negative rake angle 40a which is still within the preferred range of from about 10° to about 16°, despite the concavity of the side surfaces 30a.

The other ranges set forth hereinabove for the form of the invention shown in FIGS. 1–6 also apply to the form of the invention shown in FIG. 7. Thus, the edge bearing surface width for the concave-sided blade 12a is preferably within the range of from about 0.003 inch to about 0.010 inch; the edge margin relief angle for the blade 12a is preferably from about 3° to about 8° relative to an axial plane corresponding to the axial plane 33 of FIG. 3; and the ratio of the cutter thickness at the center of the point to the cutter width proximate the point is preferably from about ⅓ to about 1/5. Further the blade thickness taper angle is preferably from about 3° to about 8°, and the point cutting edges preferably each have a negative rake angle of one-half of the blade thickness taper angle, or from about 1½° to about 4°. The blade 12a will also have a width taper angle similar to that of the blade 12 of cutter 10, as for example a taper of about ¼ inch per foot, or about 1°11′38″.

FIG. 8 illustrates the manner in which a blade type cutter 10 according to the present invention is employed for cutting a tapered, countersunk hole in a metal workpiece. The workpiece is generally designated 70, and in the illustration comprises a pair of overlapping structural members 72 and 74 forming parts of a highly stressed structure which are to be fastened together by a tapered interference fastener such as that disclosed in Zenzic U.S. Pat. No. 3,034,611. In FIG. 8 the point 50 of blade 12 has progressed completely through the workpiece members 72 and 74 and the elongated blade cutting edges 38 have reamed the tapered bore 76 out to its final dimensions. Similarly, the cutting edges 66 of countesink-forming portion 18 of the cutter 10 have reamed out a countersink 78, which is optional to the fastening system, in the upper end of bore 76. With the various angles and dimensions of the cutter blade 12 maintained within the ranges set forth hereinabove, the tapered hole 76 will be reliably made as to both dimensional control and surface finish control. Accordingly, the required hole configuration accuracy and surface finish necessary for tapered interference fastener installations such as set forth in Zenzic U.S. Pat. No. 3,034,611 are reliably provided by the present invention.

While the present invention has been described with regard to particular embodiments, modifications may readily be made by those skilled in the art, and it is intended that the claims cover any such modifications which fall within the spirit and scope of the invention.

We claim:

1. A tapered hole cutter which comprises:
   an elongated, generally flat cutter blade having front and rear ends, a pair of opposite sides and a pair of opposite edges, said front end of said blade comprising a drill point,
   said edges of said blade comprising a pair of elongated cutting edges,
   said blade being tapered in the width direction between said cutting edges from a relatively wider rear end to a relatively narrower front end, said taper in width being substantially uniform along the length of said blade, and
   said blade being tapered in the thickness direction between said sides from a relatively thicker rear end to a relatively thinner front end.

2. A tapered hole cutter as defined in claim 1, wherein said drill point comprises a helical drill point.

3. A tapered hole cutter as defined in claim 1, wherein said drill point comprises a pair of cutting edges each having a negative rake angle.

4. A tapered hole cutter as defined in claim 3, wherein said negative rake angle of each of said point cutting edges is within the range of from about 1½° to about 4°.

5. A tapered hole cutter as defined in claim 3, wherein said negative rake angle of each of said point cutting edges is within the range of from about 2° to about 3¼°.

6. A tapered hole cutter which comprises:
   an elongated, generally flat cutter blade having front and rear ends, a pair of opposite sides and a pair of opposite edges,
   said front end of said blade comprising a drill point,
   said edges of said blade comprising a pair of elongated cutting edges,
   said blade being tapered in the width direction between said cutting edges from a relatively wider rear end to a relatively narrower front end, and
   said blade being tapered in the thickness direction between said sides from a relatively thicker rear end to a relatively thinner front end, said taper in thickness being substantially uniform along the length of said blade.

7. A tapered hole cutter as defined in claim 6, wherein said thickness taper has an included angle within the range of from about 3° to about 8°.

8. A tapered hole cutter as defined in claim 6, wherein said thickness taper has an included angle within the range of from about 4° to about 6½°.

9. A tapered hole cutter which comprises:
   an elongated, generally flat cutter blade having front and rear ends, a pair of opposite sides and a pair of opposite edges,
   said front end of said blade comprising a drill point,
   said edges of said blade comprising a pair of elongated cutting edges, each of said elongated edges having a negative rake angle,
   said blade being tapered in the width direction between said cutting edges from a relatively wider rear end to a relatively narrower front end, and said blade being tapered in the thickness direction between said sides from a relatively thicker rear end to a relatively thinner front end.

10. A tapered hole cutter as defined in claim 9, wherein said negative rake angle is within the range of from about 10° to about 16°.

11. A tapered hole cutter as defined in claim 9, wherein said blade has a thickness/width ratio proximate said drill point within the range of from about ⅛ to about 1/5.

12. A tapered hole cutter as defined in claim 9, wherein said blade has a thickness/width ratio proximate said drill point of about ¼.

13. A tapered hole cutter as defined in claim 9, wherein said sides of said blade are substantially flat.

14. A tapered hole cutter as defined in claim 9, wherein said sides of said blade are concave in transverse section.

15. A tapered hole cutter as defined in claim 14, wherein said sides of said blade are substantially straight in longitudinal section.

16. A tapered hole cutter as defined in claim 9, which comprises countersink-forming means integrally formed on said rear end of said blade.

17. A tapered hole cutter as defined in claim 16, wherein said countersink-forming means comprises a widened rear end portion of said blade having sides which are extensions of said blade sides.

18. A tapered hole cutter as defined in claim 9, which comprises mounting means extending rearwardly from said blade adapted for connection to a rotary driving tool, said mounting means having cutting fluid passage means therein with a rearward fluid input portion adapted to receive cutting fluid from said driving tool and a forward jet stream-forming portion comprising a pair of passages each of which is substantially aligned with a respective one of said blade edges and is adapted to direct a jet stream of cutting fluid along the respective said cutting edge.

19. A tapered hole cutter as defined in claim 18, wherein said mounting means comprises a rearwardly extending shank integral with said blade and a holder sleeve engageable over said shank and connectable to said driving tool, said cutting fluid passage means comprising a pair of open grooves in said shank which are at least partly covered by said sleeve.

20. A tapered hole cutter which comprises:
an elongated, generally flat cutter blade having front and rear ends, a pair of opposite sides and a pair of opposite edges,
said front end of said blade comprising a drill point,
said edges of said blade comprising a pair of elongated cutting edges, each of said edges having a leading bearing surface portion next to the cutting edge thereof, and a trailing relief surface portion next to said bearing surface portion thereof,
said blade being tapered in the width direction between said cutting edges from a relatively wider rear end to a relatively narrower front end, and
said blade being tapered in the thickness direction between said sides from a relatively thicker rear end to a relatively thinner front end.

21. A tapered hole cutter as defined in claim 20, wherein each of said bearing surface portions is arcuate in transverse section.

22. A tapered hole cutter as defined in claim 21, wherein the width of each of said bearing surface portions is within the range of from about 0.003 inch to about 0.010 inch.

23. A tapered hole cutter as defined in claim 21, wherein each of said relief surface portions breaks from its respective said bearing surface portion at a relief angle within the range of from about 3° to about 8°.

24. A tapered hole cutter as defined in claim 23, wherein said relief angle is about 5½°.

25. A tapered hole cutter as defined in claim 21, wherein each of said relief surface portions is substantially straight in transverse section.

* * * * *